(12) United States Patent
Shaw

(10) Patent No.: US 11,337,429 B2
(45) Date of Patent: May 24, 2022

(54) PANCAKE COOKING DEVICE

(71) Applicant: Thomas J. Shaw, Frisco, TX (US)

(72) Inventor: Thomas J. Shaw, Frisco, TX (US)

( * ) Notice: Subject to any disclaimer, the term of this patent is extended or adjusted under 35 U.S.C. 154(b) by 0 days.

(21) Appl. No.: 16/016,288

(22) Filed: Jun. 22, 2018

(65) Prior Publication Data

US 2019/0000092 A1     Jan. 3, 2019

Related U.S. Application Data

(60) Provisional application No. 62/526,136, filed on Jun. 28, 2017.

(51) Int. Cl.
*A21B 5/03* (2006.01)
*A47J 37/06* (2006.01)
*A21D 13/44* (2017.01)

(52) U.S. Cl.
CPC ............... *A21B 5/03* (2013.01); *A21D 13/44* (2017.01); *A47J 37/0611* (2013.01); *A47J 2037/0617* (2013.01)

(58) Field of Classification Search
CPC ............ A47J 37/0611; A47J 2037/0617; A47J 37/015; A47J 27/04
USPC .......... 99/372, 375, 378, 379, 415, 445, 446
See application file for complete search history.

(56) References Cited

U.S. PATENT DOCUMENTS

| | | | |
|---|---|---|---|
| 3,963,898 A * | 6/1976 | Tuckwell | A47J 37/0611 |
| | | | 219/524 |
| 5,983,784 A | 11/1999 | Goldberg | |
| 7,150,221 B2 | 12/2006 | Morgan | |
| 9,265,380 B2 | 2/2016 | Krishnan et al. | |
| D768,427 S | 10/2016 | Berge | |
| 9,554,670 B2 | 1/2017 | Yan | |
| 2004/0065658 A1* | 4/2004 | Damiano | A47J 36/2483 |
| | | | 219/524 |
| 2004/0094043 A1 | 5/2004 | Morgan | |
| 2005/0223907 A1 | 10/2005 | Albritton et al. | |
| 2006/0249506 A1 | 11/2006 | Robertson | |
| 2008/0105137 A1 | 5/2008 | Genslak et al. | |

\* cited by examiner

*Primary Examiner* — Phuong T Nguyen
(74) *Attorney, Agent, or Firm* — Monty L Ross PLLC; Monty L. Ross

(57) ABSTRACT

A pancake cooking device with two opposable, generally circular, internally heated cooking plates having substantially smooth cooking surfaces that are cooperatively configured to be selectively placed in facing and spaced-apart relation to contact and cook flowable pancake batter disposed between the plates to form a generally circular pancake that, when removed from the device and oriented in a preferred serving position, has a substantially uniform thickness between substantially planar, top and bottom pancake surfaces, and a continuous, circumferentially extending, outwardly inclined and upwardly facing lip of substantially uniform height disposed around the perimeter of the top surface of the pancake. The pancake cooking device is desirably configured to cook each pancake in an inverted position with the circumferentially extending, outwardly inclined lip projecting downwardly and away from the top and bottom pancake surfaces when the cooked pancake is oriented in a preferred serving position.

14 Claims, 4 Drawing Sheets

PANCAKE COOKING DEVICE

1. FIELD OF THE INVENTION

This invention relates generally to a pancake cooking device and more specifically to a pancake cooking device comprising two opposable, generally circular, electrically heated cooking plates having substantially smooth cooking surfaces that are cooperatively configured to be selectively placed in facing and spaced-apart relation to contact and cook flowable pancake batter disposed between the plates to form a generally circular pancake that, when removed from the device and oriented in a preferred serving position, has a substantially uniform thickness between substantially planar, top and bottom pancake surfaces, and a continuous, circumferentially extending, outwardly inclined and upwardly facing lip or wall of substantially uniform height disposed around the perimeter of the top surface of the pancake. The pancake cooking device is desirably configured to cook each pancake in an inverted position with the circumferentially extending, outwardly inclined lip projecting downwardly and away from the top and bottom pancake surfaces to facilitate the formation of a lip having a uniform height above the top surface of the pancake when the pancake is served. In various other embodiments of the invention, the subject pancake cooking device can be configured to cook a plurality of such pancakes in a single cooking cycle.

This invention also relates to pancakes, and a device for cooking them, that are nestable when stacked and have both a novel configuration and increased functionality when compared to conventional pancakes. One aspect of the invention relates to pancakes and a cooking device for a pancake having a disk-shaped center portion surrounded by a continuous retaining wall facing upwardly and outwardly away from the disk-shaped center portion. Another aspect of the invention relates to a pancake and a device for cooking a pancake as above with a continuous retaining wall that is preferably inclined outwardly at an angle of from about 120 to about 140 degrees, and desirably about 135 degrees, from the disk-shaped center portion. Another aspect of the invention relates to a pancake and a device for cooking a pancake having a disk-shaped center portion with an upturned side wall that ranges from about ¼ inch to about ½ inch higher than the disk-shaped center portion.

2. DESCRIPTION OF RELATED ART

In the past, pancakes have typically been made by pouring or otherwise dispensing pancake batter onto a griddle, skillet or other similarly effective heated cooking surface. The heating surface is typically flat or may have a slight crown at the center. When poured onto a hot surface, the batter typically takes the form of a disk, and because the batter contains baking powder that is intended to liberate gasses that form bubbles, expand and lighten the batter during cooking, the resultant pancakes remain substantially flat, although they often have a slight crown in the center, thereby causing the top surface of each pancake to be slightly convex.

Such griddles frequently have a smooth metal surface that is heated internally by one or more electrical resistance heating elements, or from beneath by an electrical heating element or a burner most often powered by natural gas or propane. A flowable batter is prepared and comparable aliquots of the batter are then poured onto the grill surface in laterally spaced-apart relation to cook. Depending, for example, upon the composition and viscosity of the pancake batter, the amount poured onto the griddle and the temperature of the griddle surface, the generally circular pancakes made in this way are likely to be similarly but differently sized. The pancakes are typically "flipped" or turned over approximately midway through the cooking process, and are often characterized by a top surface that is slightly convex or dome-shaped. Because pancakes are usually cooked on only one surface at a time due to the limited surface area that is contact with the heated griddle, cooking times can be longer than would otherwise be necessary, and pancakes sometimes burn on one side because of disparate cooking times arising from the need to turn them over to finish cooking.

Following cooking, homemade pancakes and restaurant-made pancakes are often stacked in groups of 2-4 pancakes each, and are served with butter and syrup or other toppings. When butter and syrup are applied to the top of one or a stack of conventional pancakes, the butter and syrup usually spread radially outward across the top pancake and then drip downwardly around the circumference and into the dish below. Pre-cooked pancakes are also commercially available in frozen form, and are sometimes grouped in stacks of three or more pancakes per package. When the packages are opened and their contents are reheated, the individual stacks again tend to have a convex upper service, which causes any butter and/or syrup placed on top of the stack to flow outwardly and downwardly around the pancakes rather than being absorbed into the pancakes.

U.S. Pat. No. 9,265,380 discloses one embodiment of a cooking appliance for flatbreads, tortillas, crepes, pitas, paninis, pancakes, etc. having two opposable, heated cooking plates in combination with a frame and a hinge configured to adjust the physical separation between the two heated cooking plates. Another embodiment is disclosed in the '380 patent that has a housing configured to cook a plurality of the subject foodstuffs (six cooking positions shown in FIG. 18).

U.S. D768,427 S discloses a design for a waffle bowl maker.

U.S. 2008/0105137 A1 discloses an electric grill having a flexible (silicone) mold placed between grill plates. The mold can be used with pancakes made with a flowable batter and the shape of the periphery of the pancakes is determined by a circular wall that defines at least a portion of a recess in which the food item is received for cooking. The batter may be poured onto the lower grill plate within the boundary of the wall and will assume an outer periphery shape defined by the wall.

U.S. 2006/0249506 A1 discloses an electric grilling appliance having opposed, removable and interchangeable grill plates or inserts. The upper and lower "clam shell" portions of the appliance are hinged at the rear and, in one embodiment, plates are disclosed that have "circular depressions" for cooking pancakes.

U.S. 2005/0223907 A1 discloses a method and appliance for making a waffle with a syrup holder or logo.

U.S. Pat. No. 7,150,221 and U.S. 2004/0094043 A1 disclose dome molds and baking assemblies useful for making cakes or desserts.

U.S. Pat. No. 5,983,784 discloses a waffle-iron type cooking apparatus having utility as a sandwich-making apparatus.

Waffle bowls and waffle bowl makers; pot pies and pie makers; Dutch baby, German or puffed pancakes; and crepes and crepe makers are all previously known, but each differs from the pancake cooking device and the pancakes disclosed here in both appearance and functionality.

SUMMARY OF THE INVENTION

A pancake cooking device is disclosed that comprises two opposable, generally circular, electrically heated cooking plates having substantially smooth cooking surfaces that are cooperatively configured to be selectively placed in facing and spaced-apart relation to contact and cook flowable pancake batter disposed between the cooking plates to form a generally circular pancake that, when removed from the device and oriented in a preferred serving position, has a substantially uniform thickness between substantially planar, top and bottom pancake surfaces, and a continuous, circumferentially extending, outwardly inclined and upwardly facing lip or wall of substantially uniform height disposed around the perimeter of the top surface of the pancake.

The cooking plates of the pancake cooking device are desirably configured to cook each pancake in an inverted position. As a flowable batter is poured into the device, the batter runs across the cooking surface of the lower cooking plate and some of the batter flows downwardly into a circumferentially extending annulus disposed around the lower cooking plate. When the lid of the device is closed is closed, the batter is confined between and contacted simultaneously by both internally heated cooking plates. As the batter cooks, it desirably forms an integral pancake having substantially flat top and bottom pancake surfaces and an annular wall. The surface formed along the lower edge of the annulus becomes the top edge of an upwardly and outwardly extending wall of the pancake when the pancake is removed from the device and served. The height, thickness and angle of inclination of the lip or wall relative to the top and bottom pancake surfaces is determined by the depth, width and orientation of the annulus relative to the top and bottom pancake surfaces. The top edge of the wall will be a substantially uniform height above the top pancake surface of the finished pancake.

In various other embodiments of the invention that will become apparent or obvious to those skilled in the art upon reading this disclosure in relation to the prior art, the subject pancake cooking device can be configured to cook a plurality of such pancakes during in a single cooking cycle, can be configured to cook pancakes of different thicknesses, or can be specially configured to cook both the pancakes as described herein and conventional waffles if desired.

In one satisfactory embodiment of the invention, internally heated upper and lower cooking plates of the subject pancake cooking device are each releasably secured to a lid or base, respectively, and the lid and base are joined by a hinge. Conventional electrical resistance heating elements, wiring for supplying electricity to the heating elements, and timers or temperature controls are desirably provided but are not fully depicted in the accompanying drawings. Prior to, during and following use, the lid can be selectively opened or closed in relation to the base to move the upper and lower cooking plates between opposable (open) and opposed (closed) positions. In some embodiments of the invention, the spacing between the opposed cooking plates can be selectively varied in accordance with the desired thickness of the pancakes through the use of slidable hinges, selectively positionable hinge pins, spring clips, and other similarly effective conventional apparatus useful for varying spacing between opposed plates.

This invention also relates to a device for cooking a pancake having a substantially flat center portion surrounded by an upturned, circumferentially extending wall that retains melted butter, syrup or other toppings on top of the pancake when served. The substantially flat center portion of the pancake is desirably between about 3 inches and 10 inches in diameter, and most preferably between about 4 inches and 8 inches in diameter, with a thickness preferably ranging from about $3/16$ to about $3/8$ inches. The upturned retaining wall desirably extends upwardly less than a half inch, and preferably from about $1/4$ to about $1/2$ inch, from the upwardly facing surface of the center portion of the pancake. In one preferred embodiment of the invention, an imaginary line drawn from the base of the inside surface of the retaining wall to the top inside edge of the retaining wall desirably forms an included angle ranging from about 120° to about 140° with a radial line extending horizontally across the top surface of the center portion from the middle of the center portion to the base of the wall to facilitate nesting of a plurality of pancakes subsequent to manufacture and prior to serving. An included angle of about 135 degrees between the top surface of the center portion and the top edge of the retaining wall is particularly preferred.

When made in this manner, the top surface of each pancake is enabled by the presence of the upturned retaining wall to hold melted butter and syrup, or other meltable, spreadable or pourable toppings, on top of the pancake for a period sufficient to allow some of the topping to be absorbed downwardly into the pancake rather than running off the sides and pooling in the serving dish. Also, because the subject pancakes are nestable, they can be served in a stack, and cuts made downwardly into the stack by a knife or fork allow the butter and syrup or other topping to flow downwardly into the stack rather than downwardly off of and around the stack prior to consumption. For commercial production of pancakes that are pre-cooked and frozen, nestability of the pancakes allows them to be packaged, stored, transported and smaller-volume packages, thereby reducing storage and transportation costs and enabling purchasers to store more pancakes per unit volume of freezer or refrigerator space.

BRIEF DESCRIPTION OF THE DRAWINGS

The apparatus of the invention is further described and explained in relation to the following drawings wherein.

Figure 1:
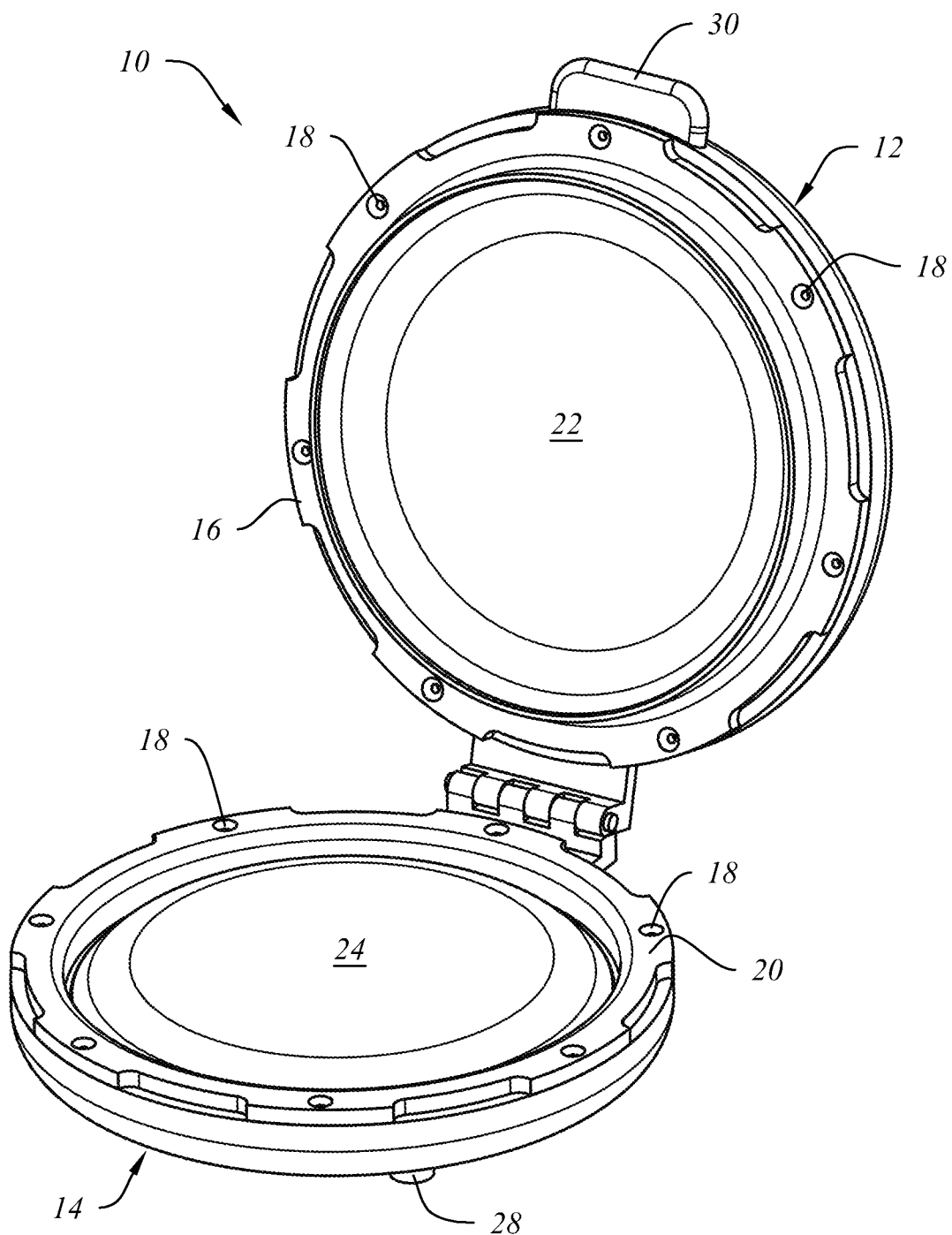
FIG. 1 is a front perspective view of a satisfactory embodiment of a pancake cooking device of the invention.

Because the accompanying drawings are presented for illustrative purposes and supplement the written disclosure, it should be understood by the reader that the objects shown in the drawings are not drawn to scale and should not be relied upon as being representative of all particular embodiments of the invention or of relative sizes, proportions or dimensions of various portions or elements of the invention as described in the specification and/or recited in the claims.

DESCRIPTION OF THE PREFERRED EMBODIMENTS

Referring to the embodiment of the invention as depicted in FIG. 1, pancake cooking device 10 comprises lid 12 and base 14 joined by hinge 26. As shown, lid 12 is in a raised or "open" position relative to base 14. In the embodiment shown, pancake cooking device 10 is configured as a counter-top appliance of the sort that would be used by an individual consumer or family to make pancakes for home use. It will be appreciated upon reading this disclosure, however, that other similarly configured variations of the subject device that are capable of cooking a plurality of pancakes substantially simultaneously can also be made within the scope of the invention. In the embodiment of FIG. 10, one of a plurality of pedestals 28 is depicted to provide vertical spacing between the bottom of base 14 and an underlying surface such as a countertop. Electrical heating elements are desirably provided inside each of lid 12 and base 14, and are preferably disposed in close contact with or internal to upper and lower cooking plates 16, 20 that are attached by fasteners 18 to lid 12 and base 14, respectively. Conventional external electrical connectors supplying electricity to pancake cooking device 10 are not shown but FIG. 2 shows portions of the electrical heating elements 32, 34 disposed in lid 12 and base 14, respectively.

Figure 2:
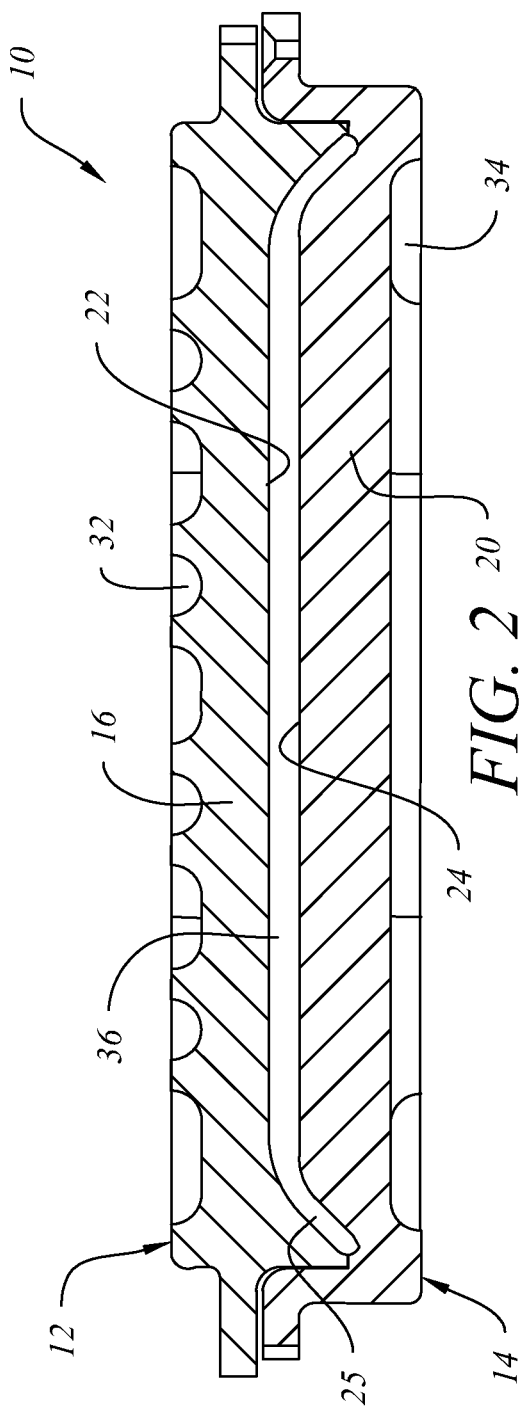
FIG. 2 is a simplified cross-sectional elevation view of the device of FIG. 1.

Upper and lower cooking plates 16, 20 further comprise top and bottom cooking surfaces 22, 24, respectively, that are each substantially flat and are cooperatively configured so that they combine to form a continuous, circumferentially extending annulus that projects downwardly from and is outwardly inclined relative to the substantially flat portions of cooking surfaces 22, 24 whenever lid 12 is closed by rotating it downwardly to a position substantially as shown in FIG. 2. In FIG. 2, space 36 disposed between closed lid 12 and base 14 is the space to be occupied by the pancake batter during use of pancake cooking device 10. Space 36 is a continuous cavity that is bounded by the substantially flat sections of the opposed and spaced-apart upper and lower cooking surfaces 22, 24 of upper and lower cooking plates 16, 20 of lid 12 and base 14, respectively, and also the downwardly and outwardly projecting annulus 25 that forms and defines the shape of pancake wall 76 as shown and described below in relation to FIGS. 4 and 5.

Figure 5:
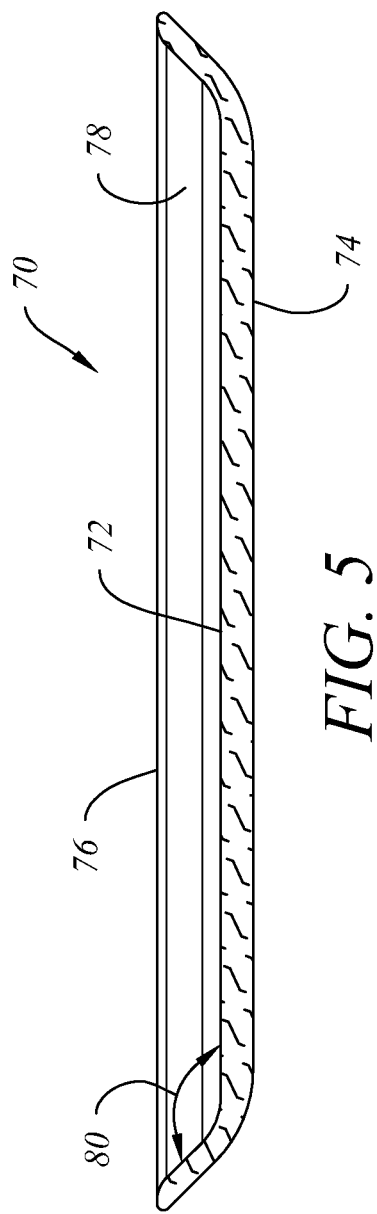
FIG. 5 is a cross-sectional elevation view taken along line 5-5 of FIG. 4.

Still referring to FIGS. 1 and 2, during use of pancake cooking device 10, a flowable pancake batter is desirably poured or otherwise dispensed onto the center portion of cooking surface 24 of lower cooking plate 20 until the batter substantially fills the downwardly projecting annulus 25 and covers lower cooking surface 24 of heated cooking plate 20. Lid 12 is then rotated downwardly and closed over base 14 so that the pancake batter is confined inside space 36 as described above. Following an interval sufficient to cook the pancake by the direct application of opposed upper and lower cooking surfaces 22, 24 to the batter, lid 12 is again opened by rotating it upwardly away from base 14, and a pancake configured similarly to pancake 70 in FIG. 5 is removed from pancake cooking device 10. Once removed from pancake cooking device 10, pancake 70 is desirably oriented to the serving position shown in FIG. 5

Figure 3:
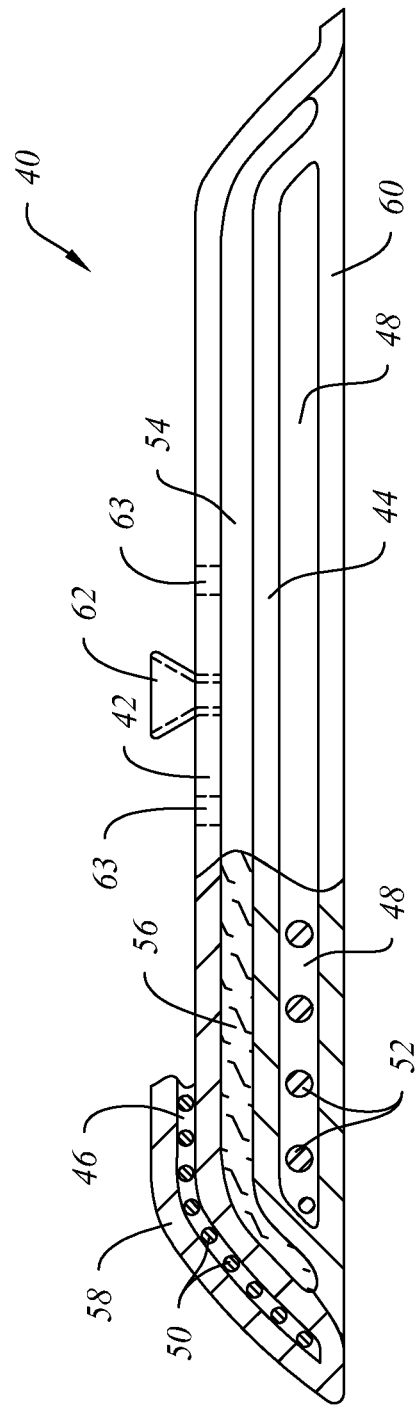
FIG. 3 is a simplified cross-sectional elevation view of another embodiment of the invention.

Referring to FIG. 3, which is simplified and partially broken away for simplification and illustrative clarity, pancake cooking device 40 comprises upper cooking plate 58 that is closed over lower cooking plate 60 prior to introducing a flowable batter 56 into the device. Upper cooking plate 58 and lower cooking plate 60 comprise internal cavities 46, 48 further comprising electrical resistance heating elements 50, 52, respectively. In this embodiment of the invention, the flowable pancake batter 56 is introduced into cooking chamber 54 through funnel 62 disposed at the center of the substantially circular pancake cooking device 40. In this embodiment, air trapped inside cooking chamber 54 as batter 56 is introduced and any excess gas generated during the pancake cooking process are desirably vented through vent holes 63. Once the pancake is cooked, it is removed from pancake cooking device 40 by opening the clamshell construction by separating upper cooking plate 58 and lower cooking plate 60 along the parting line between them as shown in FIG. 3.

Figure 4:
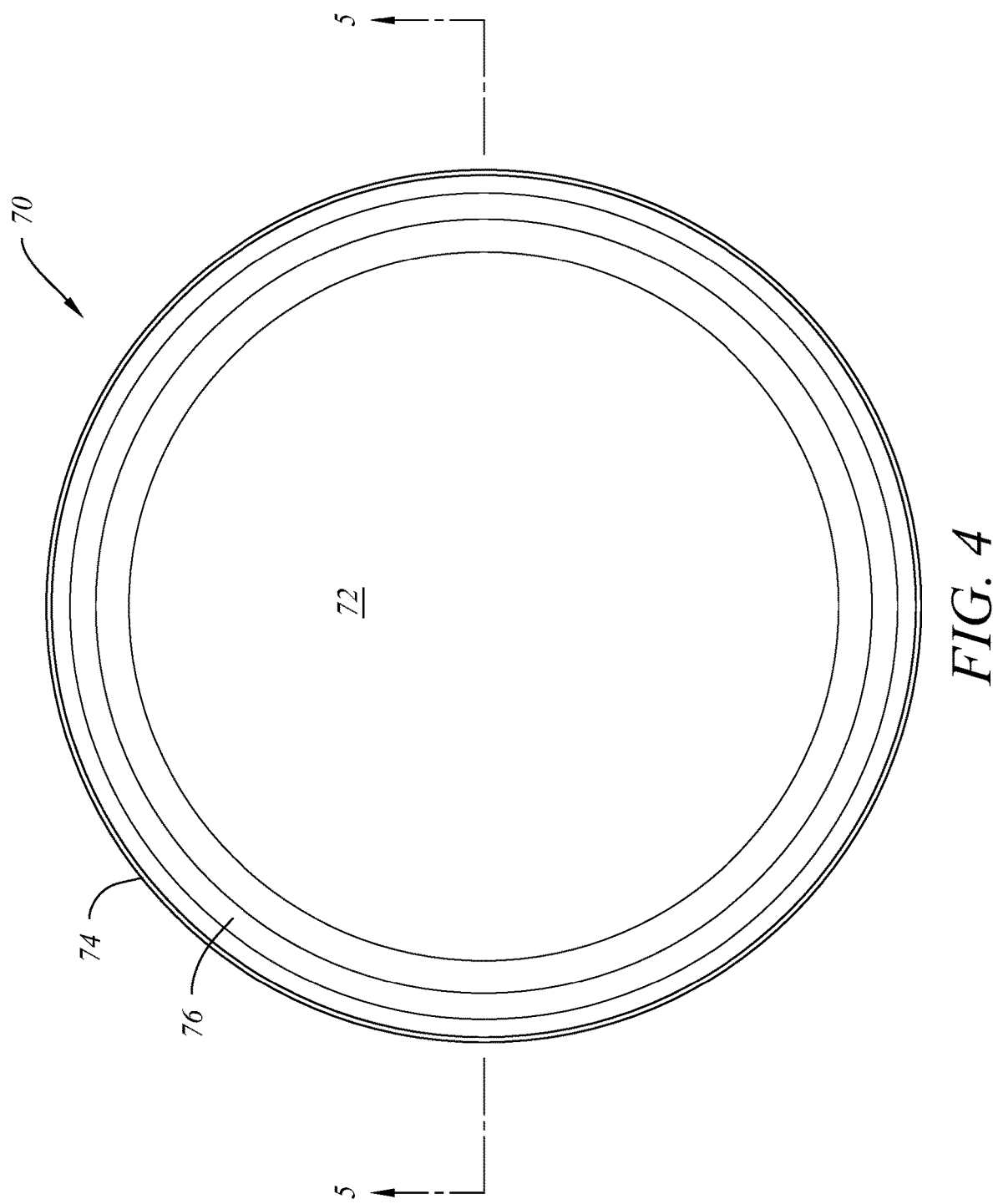
FIG. 4 is a top plan view of a pancake as made in an embodiment of the pancake cooking device of the invention as in FIG. 1.
Figure 6:
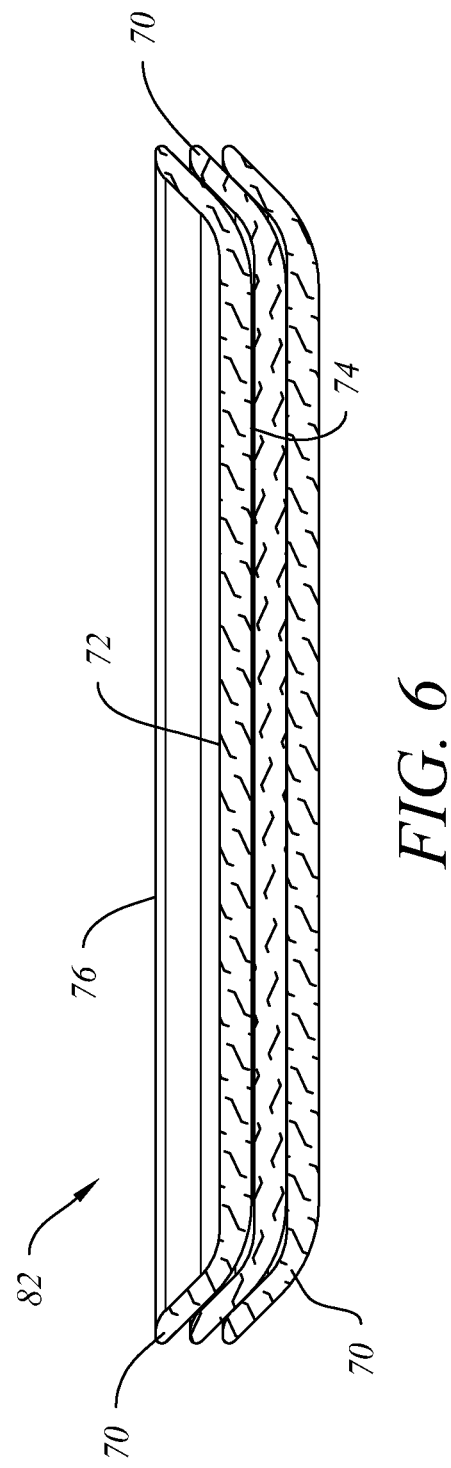
FIG. 6 is a cross-sectional elevation view of three pancakes as in FIG. 5 when stacked in a nesting relationship.

FIGS. 4-6 are provided to illustrate the shape and structure of pancakes 70 made using pancake cooking device 10 of the invention and, through reference to the shape and structure of pancakes 70, to indirectly further describe and explain the configuration of space 36 as depicted in FIG. 2 in which pancakes 70 are formed. Pancake 70 further comprises a substantially flat circular disk having an upwardly facing top pancake surface 72 that is surrounded by a continuous, upwardly extending and outwardly inclined annular wall 76, the top of which is bounded by circumferentially extending, uniformly high top edge surface 74. Because wall 76 is desirably outwardly inclined relative to top pancake surface 72, the circle defined by top edge 74 necessarily has a larger diameter than the diameter of a second circle defined by the array of points where the perimeter of surface 72 transitions to wall 66 and begins turning upwardly toward top edge surface 74.

Top pancake surface 10 is desirably between about 3 inches and 10 inches in diameter, and most preferably between about 4 inches and 8 inches in diameter, with a pancake thickness preferably ranging from about 3/16 to about 3/8 inches. Upturned wall 76 desirably extends upwardly less than an inch, and preferably less than about 1/2 inch (such as from about 1/4 to about 3/8 inch) from top pancake surface 72 of pancake 70. In one preferred embodiment of the invention, wall 76 is desirably outwardly inclined from top pancake surface 72 at an included angle 80 ranging from about 120° to about 140°, and most preferably about 135°. When wall 76 is inclined outwardly at an external angle of up to about 45° past vertical, pancakes 70 are satisfactorily configured to facilitate nesting of a plurality of pancakes 70 when stacked as depicted by stack 82 in FIG. 6. At external angles greater than 45° past vertical, or if the height of wall 16 exceeds about 3/8 in. above surface 12 of the inner disk, retaining wall 16 is more likely to collapse, especially if it is retaining syrup inside wall 76. An included angle 80 (FIG. 5) of about 135 degrees between top pancake surface 72 of the center portion and the top edge of the retaining wall is particularly preferred. Referring to FIG. 6, a stack 82 comprising a plurality of pancakes 70 is disclosed in which a pool of syrup can be retained inside wall 78 (FIG. 5), allowing the syrup to soak in and not run off the sides of pancake 70 and into an underlying plate.

Referring to FIG. 4, pancake 70 is shown in a top plan view that more clearly identifies the flat circular portion of top pancake surface 72, outwardly inclined wall 78 and top edge surface 76. Referring to FIG. 5, a cross-sectional elevation view taken along line 5-5 of FIG. 3, depicts pancake 70 in which substantially flat top pancake surface 72 is continuously surrounded by upwardly and outwardly inclined wall 78 having top edge surface 76. Arrow 80 indicates the included angle between top pancake surface 72 and the inside surface of wall 78.

Referring to FIG. 5, one embodiment of a device 40 for making the subject pancakes is depicted in which pancake 56 is disposed between heated upper and lower cooking surfaces 42, 44 that are substantially smooth and are uniformly heated by a plurality of electrical resistance heating elements 50, 52, respectively. Heating elements 50, 52 are disposed between upper and lower cooking surfaces 42, 44 and top and bottom housing members 58, 60, respectively. Any suitable method of attachment can be provided for cooperatively aligning and maintaining upper and lower cooking surfaces 42, 44 in the relative positions shown during cooking, and port 62 is desirably provided for introducing pancake batter into cooking space 54 to initiate cooking. A conventional timer or temperature indicator (not shown) can be provided to notify the user that the pancake is ready for removal from device 40. In order to remove the cooked pancake from device 40 at the appropriate time, device 40 will desirably be configured to permit upper and lower cooking surfaces 42, 44 and their associated housing members 58, 60 to be separated for such removal or for cleaning following use.

Other alterations and modifications of the invention will likewise become apparent to those of ordinary skill in the art upon reading this specification in view of the accompanying drawings, and it is intended that the scope of the invention disclosed herein be limited only by the broadest interpretation of the appended claims to which the inventor and/or Applicant are legally entitled.

What is claimed is:

1. A pancake cooking device comprising two opposable, generally circular, heated cooking plates each internally heated by a separate electrical resistance heating element and having smooth cooking surfaces that are cooperatively configured to be selectively placed in facing and spaced-apart relation to form a cooking cavity bounded by top and bottom cooking surfaces having a circular center portion and a continuous, downwardly projecting annulus facing downwardly and outwardly from the circular center portion, the subject pancake cooking device being configured to receive, confine and cook flowable pancake batter within the cooking cavity to form an inverted pancake that, when removed from the cooking cavity and oriented in an upright serving position, has flat top and bottom pancake surfaces surrounded by an upwardly and outwardly inclined wall of uniform height above the top pancake surface.

2. The pancake cooking device of claim 1 wherein a first heated cooking plate is disposed in a lid of the device.

3. The pancake cooking device of claim 2 wherein a second heated cooking plate is disposed in a base of the device.

4. The pancake cooking device of claim 3 wherein the lid and base are joined by a hinge configured to selectively reposition the heated cooking plates to achieve a desired facing and spaced-apart relation between the cooking surfaces.

5. The pancake cooking device of claim 3 wherein the included angle is about 135 degrees.

6. The pancake cooking device of claim 1 wherein the hinge is selectively adjustable to control the spaced-apart relation between the cooking surfaces.

7. The pancake cooking device of claim 1 wherein the cooking cavity is configured to cook pancakes having a configuration that allows each pancake to nest together with another pancake when stacked.

8. The pancake cooking device of claim 1 wherein the top pancake surface and the inclined wall meet at an included angle that ranges from about 120 degrees to about 140 degrees.

9. The pancake cooking device of claim 1 wherein the uniform height of the wall is less than an inch from the top pancake surface.

10. The pancake cooking device of claim 9 wherein the uniform height of the wall is less than about ½ inch from the top pancake surface.

11. The pancake cooking device of claim 10 wherein the uniform height of the wall is between about ¼ inch and ⅜ inch from the top pancake surface.

12. The pancake cooking device of claim 1 wherein the diameter of the top pancake surface ranges from about 3 to about 10 inches.

13. The pancake cooking device of claim 12 wherein the diameter of the top pancake surface ranges from about 4 to about 8 inches.

14. The pancake cooking device of claim 1 wherein the distance between the top pancake surface and the bottom pancake surface ranges from about 3/16 inch to about ⅜ inch.

* * * * *